United States Patent
Liu

(10) Patent No.: US 9,961,417 B2
(45) Date of Patent: May 1, 2018

(54) DEVICE AND METHOD FOR ACQUIRING ELECTRICITY UTILIZATION INFORMATION

(71) Applicant: Bing Liu, Beijing (CN)

(72) Inventor: Bing Liu, Beijing (CN)

(73) Assignee: Bing Liu, Beijing (CN)

( * ) Notice: Subject to any disclaimer, the term of this patent is extended or adjusted under 35 U.S.C. 154(b) by 0 days. days.

(21) Appl. No.: 15/115,107

(22) PCT Filed: Feb. 12, 2015

(86) PCT No.: PCT/CN2015/072908
§ 371 (c)(1),
(2) Date: Nov. 16, 2016

(87) PCT Pub. No.: WO2015/113522
PCT Pub. Date: Aug. 6, 2015

(65) Prior Publication Data
US 2017/0070793 A1    Mar. 9, 2017

(30) Foreign Application Priority Data
Jan. 28, 2014   (CN) .......................... 2014 1 0041259

(51) Int. Cl.
*H04Q 9/00*       (2006.01)
*F03D 7/02*       (2006.01)

(52) U.S. Cl.
CPC ............ *H04Q 9/00* (2013.01); *F03D 7/0284* (2013.01); *H04Q 2209/823* (2013.01)

(58) Field of Classification Search
None
See application file for complete search history.

(56) References Cited

U.S. PATENT DOCUMENTS

| 2013/0039395 A1* | 2/2013 | Norconk | H04B 5/0031 |
| | | | 375/219 |
| 2014/0236371 A1* | 8/2014 | Ishihara | H04Q 9/00 |
| | | | 700/293 |

FOREIGN PATENT DOCUMENTS

| CN | 101610005 | 12/2009 |
| CN | 102590610 | 7/2012 |

(Continued)

OTHER PUBLICATIONS

International Search Report for Application No. PCT/CN2015/072908 dated May 25, 2015.

(Continued)

*Primary Examiner* — Leon-Viet Nguyen
(74) *Attorney, Agent, or Firm* — Jenkins, Wilson, Taylor & Hunt, P.A.

(57) ABSTRACT

The present invention relates to a device for acquiring electricity utilization information which comprises a data acquisition and processing circuit configured to detect an operation parameter about a coupleable power supply circuit; a non-isolated power supply configured to convert an AC power into a DC power to supply an appropriate operation voltage to the data acquisition and processing circuit; a data communication module configured to modulate the detected operation parameter onto a predetermined frequency, wherein the modulated operation parameter is transmitted with a predetermined data transmission rate, and the predetermined frequency is higher than the predetermined data transmission rate such that the transmitted operation parameter can be demodulated; and an isolation component configured to provide electrical isolation and signal transmission isolation to perform a coupling isolation for the modulated operation parameter. The device not only can (Continued)

achieve divided measurement of electricity utilization, but also has the advantage of smaller volume.

20 Claims, 7 Drawing Sheets

(56) References Cited

FOREIGN PATENT DOCUMENTS

| | | |
|---|---|---|
| CN | 103267893 | 8/2013 |
| CN | 203310908 | 11/2013 |
| CN | 103777100 | 5/2014 |
| JP | 2011089915 | 5/2011 |
| JP | 2011137782 | 7/2011 |

OTHER PUBLICATIONS

IPRP with Written Opinion for Application No. PCT/CN2015/072908 dated Aug. 2, 2016.

* cited by examiner

DEVICE AND METHOD FOR ACQUIRING ELECTRICITY UTILIZATION INFORMATION

FIELD OF THE INVENTION

The present invention relates to the field of power electronics, and in particular to a device and a method for acquiring electricity utilization information.

BACKGROUND

With the high speed development of economy, influence of energy consumption and environmental pollution on people's life has been paid more and more attentions. Energy-saving and emission-reduction have become a social problem concerning national welfare and the people's livelihood. Scientific electricity utilization with the objects of rational and economical electricity utilization is one of the focuses of energy-saving and emission-reduction. Scientific electricity utilization is based upon timely and accurate acquisition of electricity utilization information, and energy consumption analysis and power usage management based on the electricity utilization information.

FIG. 1 shows a technical proposal for acquiring electricity utilization information. As shown in FIG. 1, an isolated power supply 110 is configured to convert an input AC power into a DC power to provide a suitable voltage VDD to a data acquisition and processing circuit 120, and to provide a suitable voltage VCC to a RS485 circuit 130. An isolated DC/DC circuit 150 provides electrical isolation for VDD and VCC. The value of voltage VDD is determined from the operation voltage of the data acquisition and processing circuit 120; and the value of voltage VCC is determined from the operation voltage of the RS485 circuit 130. The isolated power supply 110 generally includes an isolation transformer and a rectifying filtering circuit wherein the isolation transformer provides an electrical isolation. The data acquisition and processing circuit 120 is configured to detect an operation parameter of a power supply circuit 900. The operation parameter may include an operation current and an operation voltage, etc of the power supply circuit 900. An optical coupling component 140 located between the data acquisition and processing circuit 120 and the RS485 circuit 130 is configured to isolate signal transmission. The RS485 circuit 130 transmits the detected operation parameter to a remote server 190 via a RS485 bus. Generally, the isolated power supply 110, the data acquisition and processing circuit 120, the optical coupling component 140, the RS485 circuit 130 and the isolated DC/DC circuit 150 are enclosed in one measuring device 100 that is mounted in a distribution box for providing operation parameters of one power supply circuit 900 to the remote server 190. A power supply circuit generally includes a plurality of power supply sub-circuits. For example, a power supply circuit may include a plurality of power supply sub-circuits such as an illumination circuit, a receptacle circuit and an air conditioning circuit.

In practical applications, one electric energy meter is provided for each power supply circuit (such as the power supply circuit corresponding to the above-mentioned measuring device 100) to measure the consumed electrical energy. However, users, especially those consuming energy heavily in civil buildings such as state organs' office buildings and large size public buildings, can not find possible energy-saving links with a definite object in view since they use one electric energy meter for providing overall electricity utilization information of the power supply circuit.

In order to analyze energy consumption more accurately, it is desired to be able to monitor energy consumption of individual power supply sub-circuits at the same time, that is, to implement divided measurement or sub-metering of electricity utilization. It has been proposed to implement divided measurement of electricity utilization of each power supply sub-circuit by the measuring device 100 shown in FIG. 1. However, since the isolated power supply 110 has a large volume, and the isolated DC/DC circuit 150 and the optical coupling component 140 are required for the RS485 circuit 130, the detection device 100 is bulky. If a plurality of the measuring devices 100 are used to monitor a plurality of power supply sub-circuits, a large space will be occupied. Therefore, this proposed solution is difficult to be applied in practice.

SUMMARY

The present invention provides a device for acquiring electricity utilization information that can both implement divided measurement of electricity utilization and have the advantage of smaller volume.

According to an aspect of the present invention, there is provided a device for acquiring electricity utilization information comprising: a data acquisition and processing circuit configured to detect an operation parameter about a coupleable power supply circuit; a non-isolated power supply configured to convert an AC power into a DC power to supply an appropriate operation voltage to the data acquisition and processing circuit; a data communication module configured to modulate the detected operation parameter onto a predetermined frequency, wherein the modulated operation parameter is transmitted with a predetermined data transmission rate, and the predetermined frequency is higher than the predetermined data transmission rate such that the transmitted operation parameter can be demodulated; and an isolation component configured to provide electrical isolation and signal transmission isolation to isolate the modulated operation parameter.

According to an aspect of the present invention, there is provided a method for acquiring electricity utilization information comprising: converting an AC power into a DC power to provide an appropriate operation voltage; detecting an operation parameter of a coupleable power supply circuit with the operation voltage; modulating the detected operation parameter onto a predetermined frequency, wherein the modulated operation parameter is transmitted with a predetermined data transmission rate, and the predetermined frequency is higher than the predetermined data transmission rate such that the transmitted operation parameter can be demodulated; and providing electrical isolation and signal transmission isolation to isolate the modulated operation parameter.

In the device for acquiring electricity utilization information according to the present invention, a non-isolated power supply is used to supply an operation voltage to a data acquisition and processing circuit, and a data communication module modulates an operation parameter detected by the data acquisition and processing circuit onto a predetermined frequency. In addition, an isolation component for achieving electrical isolation and signal transmission isolation is further provided to perform a coupling isolation for the modulated operation parameter. Therefore, the device not only can realize divided measurement of electricity utilization, but also have the advantage of smaller volume.

It is easy for the device for acquiring electricity utilization information according to the present invention to be applied widely in practice.

BRIEF DESCRIPTION OF DRAWINGS

The above-mentioned and other features, characteristics, advantages and benefits of the present invention will become more apparent by the detailed description in conjunction with accompanying drawings, wherein.

Like reference numerals indicate similar or corresponding features or functions throughout the figures.

DETAILED DESCRIPTION

Figure 1:
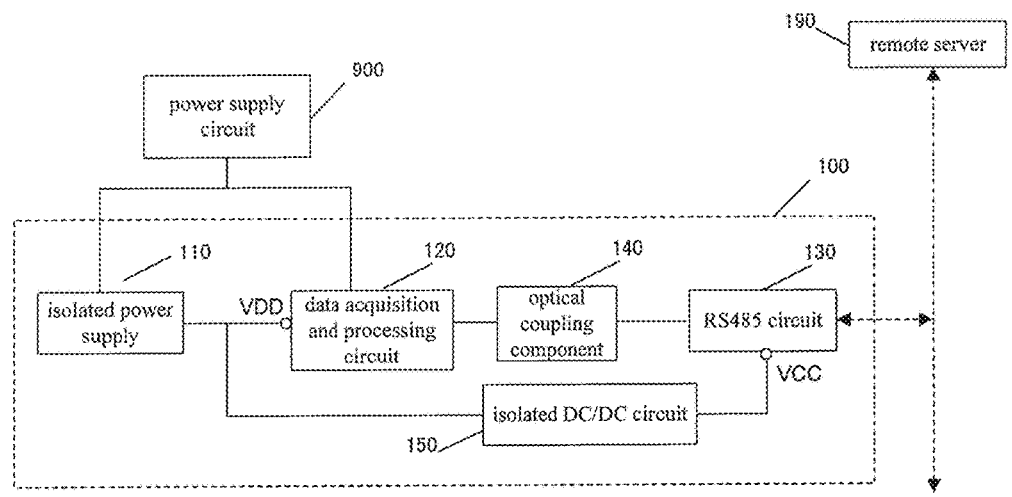
FIG. 1 is a schematic diagram showing a conventional device for acquiring electricity utilization information.
Figure 2:
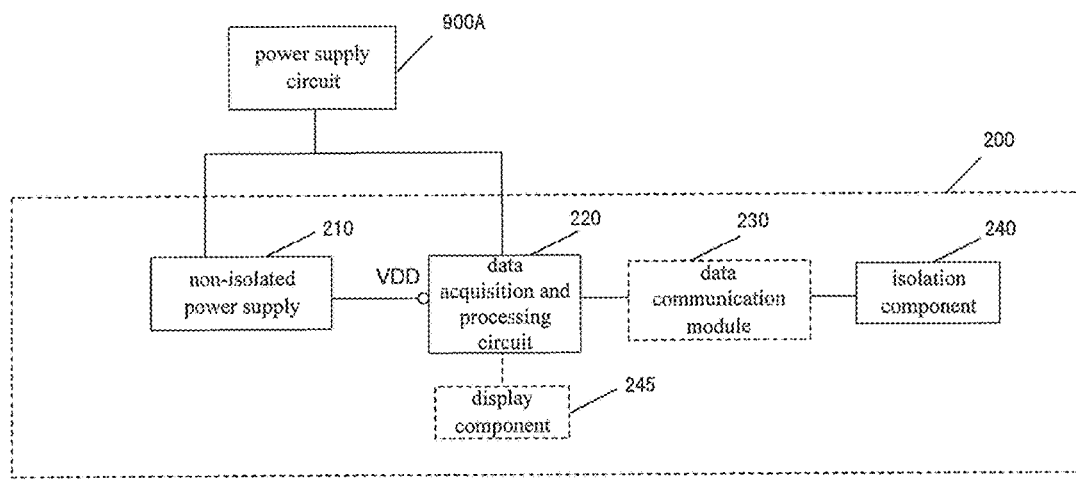
FIG. 2 is a schematic diagram showing a device for acquiring electricity utilization information according to one embodiment of the present invention.

FIG. 2 is a schematic diagram showing a device for acquiring electricity utilization information according to one embodiment of the present invention. As shown in FIG. 2, a non-isolated power supply 210 is configured to convert an input AC power into a DC power to provide an appropriate operation voltage VDD to a data acquisition and processing circuit 220. The value of voltage VDD is determined according to the operation voltage of the data acquisition and processing circuit 220. The data acquisition and processing circuit 220 is configured to detect an operation parameter of a coupleable power supply circuit 900A. The operational parameter may include an operation current, an operation voltage, a residual current, a power factor and an operation temperature, etc. of the power supply circuit 900A. Here, the power supply circuit 900A may be the power supply circuit 900 for one measuring device 100 shown in FIG. 1, or may be any one of sub-circuits that constitute the power supply circuit 900. In one embodiment, the power supply circuit 900A is an illumination circuit. In another embodiment, the power supply circuit 900A is an air conditioning circuit. A data communication module 230 is configured to modulate the detected operation parameter onto a predetermined frequency, wherein the modulated operation parameter is transmitted with a predetermined data transmission rate, and the predetermined frequency should be much higher than the predetermined data transmission rate such that the transmitted operation parameter can be demodulated. In one embodiment, when the data transmission rate is expressed by a bit rate (or baud rate B) (the data transmission rate may also be expressed by a "bit time (Td)" that is the time required for transmitting one binary bit, Td=1/B), if the data transmission rate is 9600 bps (namely baud rate B=9600 bits per second), then the predetermined frequency is 120 kHz or higher, such that a receiving end for receiving the modulated operation parameter can demodulate the operation parameter accurately. An isolation component 240 is configured to perform a coupling isolation for the modulated operation parameter. The isolation component 240 is a passive coupling isolation component. In one embodiment, the isolation component 240 is a magnetic coupling isolation transformer with a primary to secondary turn ratio of 1:1. The isolation component 240 can enhance immunity from interference of communication while providing electrical isolation and signal transmission isolation.

Figure 3A:
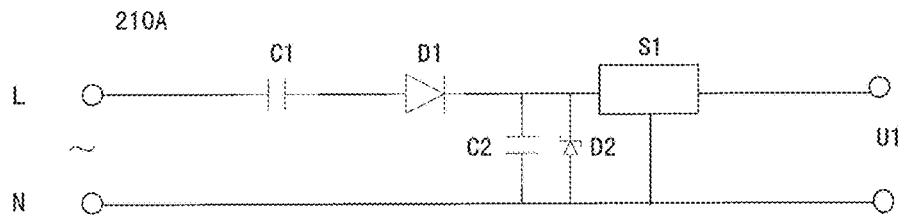
FIG. 3A is a schematic diagram showing a non-isolated power supply according to one embodiment of the present invention.

FIG. 3A shows one embodiment of the non-isolated power supply 210 shown in FIG. 2. As shown in FIG. 3A, the non-isolated power supply 210A includes: a step-down capacitor C1, a rectifying filtering circuit composed of a diode D1 and a capacitor C2, and a voltage stabilizing circuit composed of a diode D2 and a voltage stabilizer S1. The step-down capacitor C1 is configured to decrease an electric potential generated by at least one phase AC power of a three phase AC power. The AC power with the reduced potential is rectified by the diode D1 and filtered by the filter C2, and then supplied to the diode D2 and the voltage stabilizer S1. The diode D2 and the voltage stabilizer S1 stabilize the voltage output from the filter C2. The voltage-regulated power supply U1 may be used to provide an operation voltage VDD to the data acquisition and processing circuit 220 shown in FIG. 2.

Figure 3B:
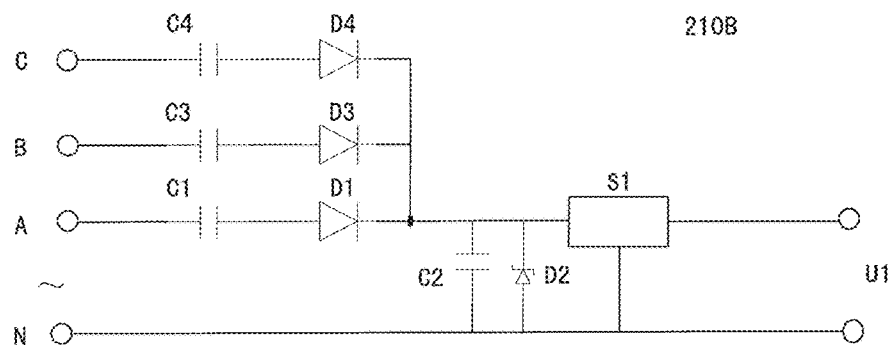
FIG. 3B is a schematic diagram showing a non-isolated power supply according to another embodiment of the present invention.

FIG. 3B is a schematic diagram showing a non-isolated power supply 210B according to another embodiment of the present invention. In FIG. 3B, three parallel connected step-down capacitors C1, C3 and C4 are connected with A, B and C phases of a three-phase AC power supply, respectively. Diodes D1, D3 and D4 are connected with step-down capacitors C1, C3 and C4, respectively and diodes D1, D3 and D4 are all connected with the filtering capacitor C2 so as to constitute a rectifying filtering circuit for rectifying and filtering the AC power with reduced voltage. The diode D2 and the voltage stabilizer S1 control the stabilization of the output voltage U1. The non-isolated power supply shown in FIG. 3B can provide a stabilized voltage U1 in case that one or two phases of the three-phase AC power supply fail, thereby enhancing the system's reliability.

Figure 4A:
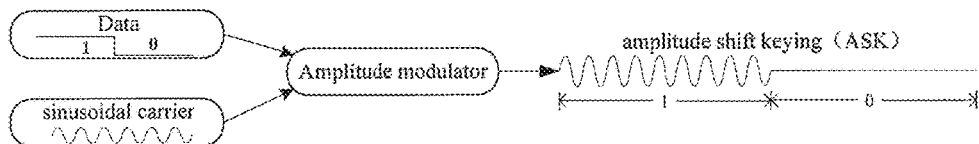
FIG. 4A is a schematic diagram showing an ASK (amplitude shift keying) modulation pattern according to one embodiment of the present invention.
Figure 4B:
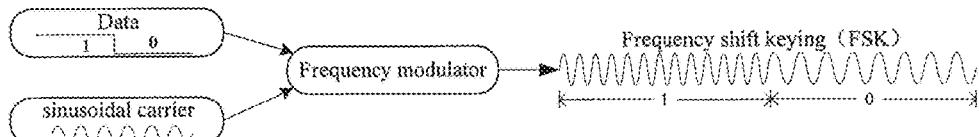
FIG. 4B is a schematic diagram showing an FSK (frequency shift keying) modulation pattern according to another embodiment of the present invention.
Figure 4C:
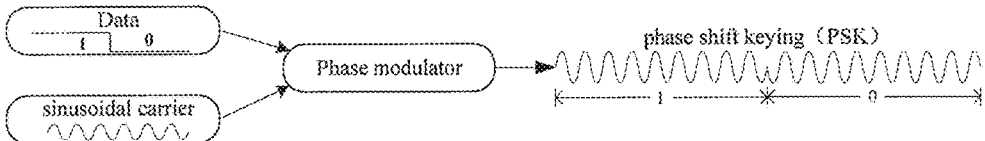
FIG. 4C is a schematic diagram showing a PSK (phase shift keying) modulation pattern according to yet another embodiment of the present invention.

In the device 200 for acquiring electricity utilization information shown in FIG. 2, the data communication module 230 may utilize an ASK modulation mode to modulate an operation parameter onto a predetermined frequency; may also utilize an FSK modulation mode to modulate an operation parameter onto a predetermined frequency; or may also utilize a PSK modulation mode to modulate an operation parameter onto a predetermined frequency. FIGS. 4A, 4B and 4C show schematic diagrams of modulating an operation parameter with the ASK, FSK and PSK modulation modes respectively.

In the device 200 for acquiring electricity utilization information shown in FIG. 2, the data communication module 230 for modulating an operation parameter onto a predetermined frequency can be implemented by a computer software or by a hardware circuit. The data communication module 230 may be a module independent of the data acquisition and processing circuit 220 or may be also integrated in the data acquisition and processing circuit 220. Furthermore, in the device 200 for acquiring electricity utilization information shown in FIG. 2, a display component may be further provided to in time display operation parameters detected by the data acquisition and processing circuit 220.

As compared with the measuring device 100 shown in FIG. 1, since no isolated power supply 110 is used and no isolated DC/DC circuit 150 and optical coupling component 140 for the RS485 circuit 130 are provided, it is possible to significantly reduce the volume of the device 200 for acquiring electricity utilization information when the non-isolated power supply 210, the data acquisition and processing circuit 220, the data communication module 230 and the isolation component 240 are assembled in one box to be used as the device 200 (shown in FIG. 2).

Figure 5:
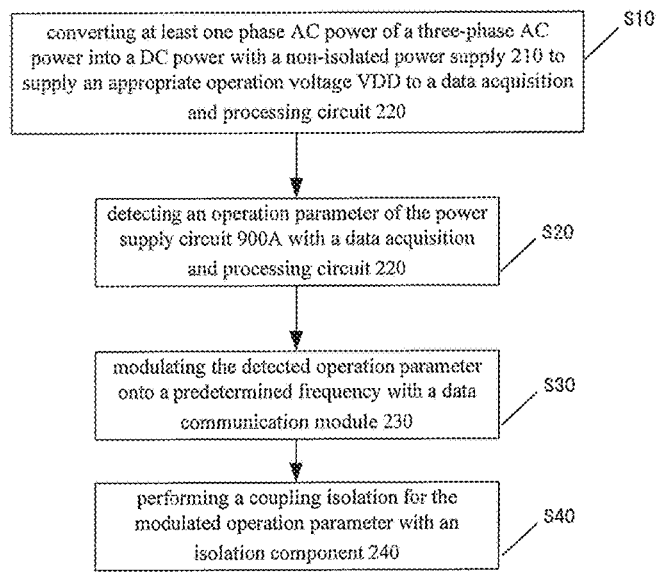
FIG. 5 is a flow chart of a method for acquiring electricity utilization information according to one embodiment of the present invention.

FIG. 5 is a flow chart of a method for acquiring electricity utilization information according to one above-mentioned embodiment of the present invention. As shown in FIG. 5, firstly, at least one phase AC power of a three-phase AC power supply is converted into a DC power by a non-isolated power supply 210 to provide an appropriate operation voltage VDD to a data acquisition and processing circuit 220 (step S10). The value of voltage VDD is determined according to the operation voltage of the data acquisition and processing circuit 220. The data acquisition and processing circuit 220 detects an operation parameter of the power supply circuit 900A (step S20). The operational parameter may include an operation current, an operation voltage, a residual current, a power factor and an operation temperature and so on of the power supply circuit 900A. A data communication module 230 modulates the detected operation parameter onto a predetermined frequency (step S30), wherein the modulated operation parameter is transmitted with a predetermined data transmission rate, and the predetermined frequency should be much higher than the predetermined data transmission rate such that the transmitted operation parameter can be demodulated. An isolation component 240 performs a coupling isolation for the modulated operation parameter (step S40). The coupling isolation may include an electrical isolation and signal transmission isolation. The isolation component 240 is a passive coupling isolation component. In one embodiment, the isolation component 240 is a magnetic coupling isolation transformer with a primary to secondary turn ratio of 1:1.

Figure 6:
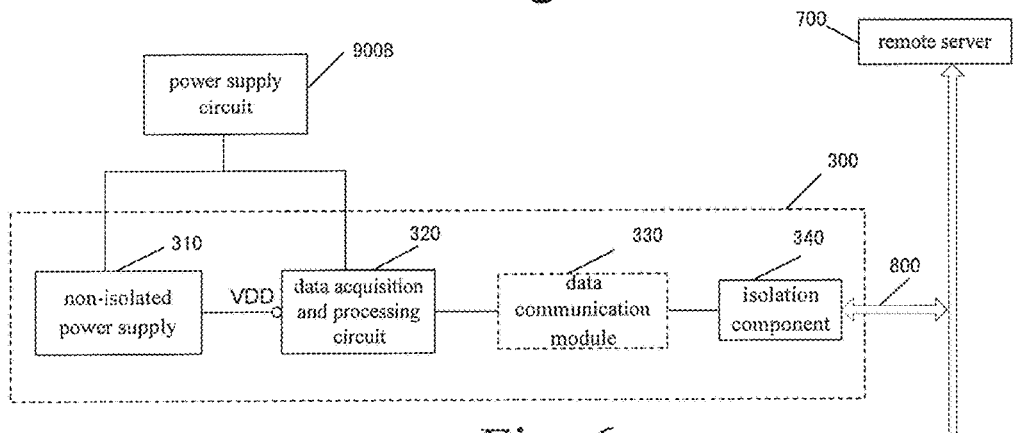
FIG. 6 is a schematic diagram showing a device for acquiring electricity utilization information according to another embodiment of the present invention.

FIG. 6 is a schematic diagram showing a device for acquiring electricity utilization information according to another embodiment of the present invention. In FIG. 6, a non-isolated power supply 310, a data acquisition and processing circuit 320, a data communication module 330, and an isolation component 340 have identical or similar structures and functions with the non-isolated power supply 210, the data acquisition and processing circuit 220, the data communication module 230 and the isolation component 240 as shown in FIG. 2, respectively, and thus the description thereof will be omitted herein for simplicity. Since no isolated power supply is used, it is possible to significantly reduce the volume of a device 300 for acquiring electricity utilization information when the non-isolated power supply 310, the data acquisition and processing circuit 320, the data communication module 330 and the isolation component 340 are assembled in one box to be used as the device 300.

In the embodiment shown in FIG. 6, the data communication module 330 modulates an operation parameter associated with a power supply circuit 900B detected by the data acquisition and processing circuit 320 onto a predetermined frequency. The modulated operation parameter is output to a bus 800 via the isolation component 340 and then transmitted to a remote server 700 at a predetermined data transmission rate. The bus 800 can transmit data by means of a bus contention communication mode, as to be detailed below with reference to FIG. 7. The remote server 700 may receive the operation parameter transmitted via said bus 800 and generate electricity utilization information from the operation parameter. The electricity utilization information is supplied to a user (for example, displayed to the user), which can be used for energy consumption analysis and electricity utilization management of the user. In one embodiment, the power supply circuit 900B is an illumination circuit. According to the operation parameter such as the operation voltage and the operation current of the power supply circuit 900B, the remote server 700 can calculate the electrical energy consumed by the illumination circuit. In case of too high energy consumption, certain measures should be taken to avoid waste of power. For example, it is possible to control the lighting switching times or replace energy-saving lighting appliances according to the demand for the illumination environment.

Figure 7:
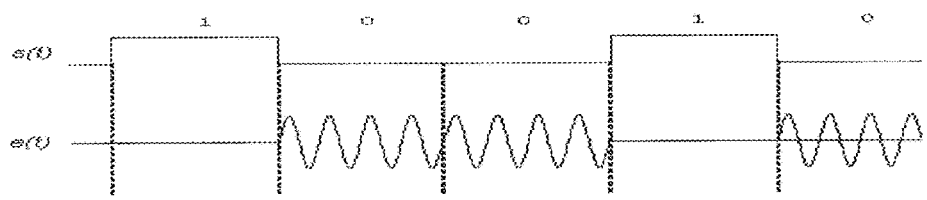
FIG. 7 shows a schematic diagram of modulating an operation parameter by use of an ASK modulation mode according to one embodiment of the present invention.

The bus contention communication mode used by the bus 800 will be described in detail below with reference to FIG. 7. In one embodiment using an ASK modulation mode, a bit "0" is defined as a transmission mode (that is, the bus is in an occupied state), and a bit "1" is defined as an idle mode (that is, the bus is in an idle state). FIG. 7 is a schematic diagram showing modulating data (namely, an operation parameter) with the ASK modulation mode. In one embodiment, it is prescribed that "0" has a higher priority than "1". A priority of data to be transmitted is expressed with a set of binary numerals of bits "0" and "1" as a control field. Generally, data requiring urgent processing has a higher priority than data representing ordinary information. For example, when an operation temperature of the power supply circuit 900B is high and tends to cause fire, it is required to send an alarm signal to the remote server 700 for prompting the user that a potential electrical safety hazard may exist in the power supply circuit 900B. As compared with the priority of the signal that for example indicates the energy consumed by the power supply circuit 900B, the priority of the alarm signal should be set higher. Different types of data to be transmitted may be set with respective priorities in advance. In a preferred embodiment, the control field representing priority is set in a data frame at a position close to a frame head as much as possible.

According to the bus contention communication mode, a communication device such as the data communication module 330 needs to listen for a bus simultaneously while transmitting the data to be transmitted to the bus. If it is found out that another communication device connected with the bus is transmitting data with a higher priority, then the communication device must stop transmission of the data and exit bus contention. In the above-mentioned embodiment, if the control field for representing priority of data to be transmitted as sent via the isolation component 340 by the data communication module 330 has a bit value 1, and the control field for representing priority of data to be transmitted as sent by another communication device and received via the bus has a bit value 0, then this indicates that a bus contention occurs and the data transmitted by the another communication device has a priority higher than that transmitted by the communication device. Therefore, the communication device must stop data transmission and give up the bus to make the bus available for said another communication device.

With the bus contention communication mode, data requiring urgent processing can take precedence for transmission, which improves the response speed of the system.

In addition, as shown in FIG. 7, a signal modulated by the data communication module 330 is an AC signal. Since an AC signal is transmitted on the bus 800, even when one communication node (e.g., the device 300 for acquiring electricity utilization information) fails, the communication node can still exhibit a certain AC impedance on the bus 800, which therefore will not cause short circuit of the entire communication line for transmission over the bus 800, so as to effectively improve the stability of the system. Furthermore, since the communication node can not transmit data, it is possible to locate the failed node quickly.

The device for acquiring electricity utilization information proposed according to the present invention can implement a divided measurement of electricity utilization. Furthermore, the detected power supply circuit is analyzed to determine from the modulated operation parameter whether there is any potential electrical safety hazard such as electrical leakage, overload, and abnormal power line loss in the detected power supply circuit, and thus further countermeasures such as disconnecting the power supply circuit or providing warning information are taken, which is another advantage of the present invention.

Figure 8:
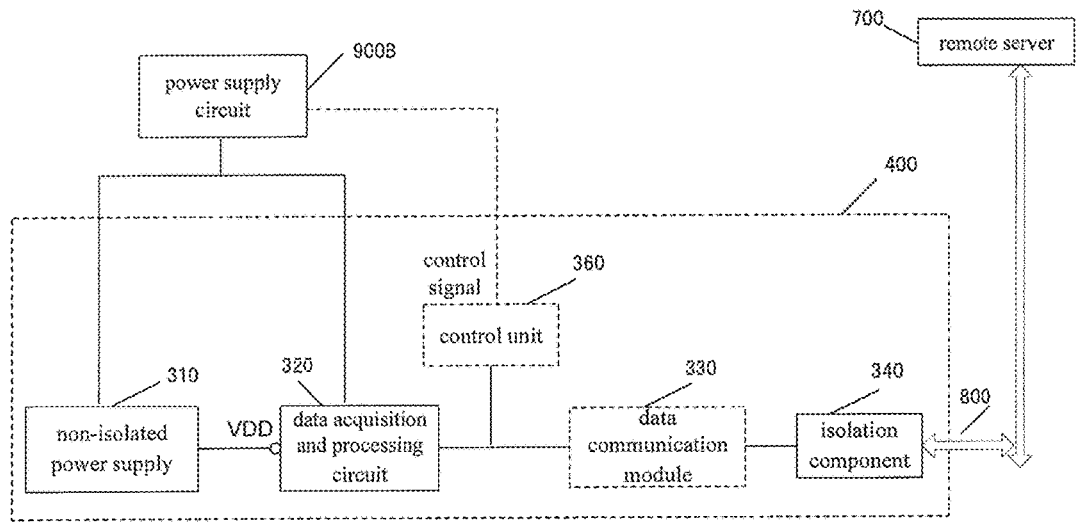
FIG. 8 is a schematic diagram showing a device for acquiring electricity utilization information according to another embodiment of the present invention.

FIG. 8 is a schematic diagram showing a device for acquiring electricity utilization information according to another embodiment of the present invention. In FIG. 8, the device includes a control unit 360. The control unit 360 receives an operation parameter detected by a data acquisition and processing circuit 320. By comparing the operation parameter to a predetermined threshold, the control unit 360 can generate a control signal for disconnecting said power supply circuit 900B and/or an alarm signal for indicating that there is a potential electrical safety hazard in said power supply circuit 900B.

Figure 9:
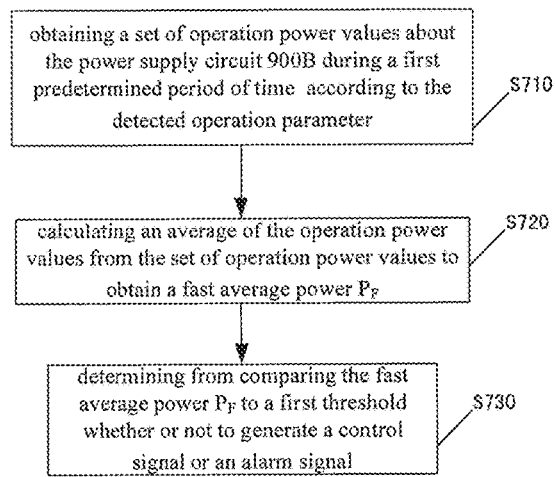
FIG. 9 is a flow chart of a method of generating a control signal according to one embodiment of the present invention.

FIG. 9 shows a specific embodiment of generating the control signal and/or the alarm signal. As shown in FIG. 9, firstly, during a first predetermined period of time, e.g., 20 milliseconds, the control unit 360 receives an operation voltage and an operation current about the power supply circuit 900B as detected by the data acquisition and processing circuit 320 at different sampling instants. Based on the operation voltage Ui and the operation current Ii about the power supply circuit 900B as detected at a sampling instant Ti, it is possible to obtain the operation power value Pi at the sampling instant Ti, namely: $P_i = U_i * I_i$. According to the detected operation parameters, the control unit 360 may obtain a set of operation power values about the power supply circuit 900B during the first predetermined period of time (step S710). Base on the set of operation power values, it is possible to calculate the average of the operation power values over the first predetermined period of time, thereby obtaining a fast average power $P_F$ of the power supply circuit 900B (step S720). In one embodiment, N sets of operation voltages and operation currents are acquired during the first predetermined period of time, then:

$$p_F = \left(\sum_{i=1}^{N} Ui * Ii\right) / N$$

It is determined from comparing the fast average power $P_F$ to a first threshold whether or not to generate the control signal or the alarm signal (step S730). In one solution, if the fast average power $P_F$ is greater than the first threshold, then the control unit 360 generates the control signal that can start the operation of disconnecting the power supply circuit 900B. In one embodiment, the control signal may be supplied to an electric relay (not shown). By the operation of the electric relay, it is possible to disconnect the power supply circuit 900B. If the fast average power $P_F$ approximates the first threshold but does not exceed the first threshold, then the control unit 360 generates an alarm signal. The alarm signal is modulated onto a predetermined frequency by the data communication module 330 and transmitted to the bus 800 via the isolation component 340. The remote server 700 receives the alarm signal via the bus 800. The alarm signal will be provided to the user, which is used as an alerting message indicating that the power supply circuit 900B is risking a potential electrical safety hazard. For example, it is possible to display the alerting message on a display; or to alert the user by providing an illuminating device or a speaker device.

In practical applications, some electricity utilization equipments such as an air conditioner would experience a large transient current upon startup, which may cause the fast average power $P_F$ to exceed the first threshold, so as to generate the control signal or the alarm signal. In order to avoid wrongly generating of the control signal or alarm signal, several secondary solutions are provided here. Combining one or more of these secondary solutions with the above-mentioned method shown in FIG. 9 can enhance the accuracy of generating the control signal and/or the alarm signal by the system.

In a secondary solution, during a second predetermined period of time, the control unit 360 receives an operation voltage and operation current about the power supply circuit 900B detected by the data acquisition and processing circuit 320 at different sampling instants. According to the detected operation voltages and operation currents, the control unit 360 obtains a set of operation power values about said power supply circuit during the second predetermined period of time. The second predetermined period of time is longer than the first predetermined period of time. For example, the first predetermined period of time is 20 milliseconds, and the second predetermined period of time is 10 seconds. According to the set of operation power values about said power supply circuit during the second predetermined period of time, the control unit 360 calculates a slow average power $P_S$ of said power supply circuit. In one embodiment, M sets of operation voltages and operation currents are acquired during the second predetermined period of time (in case of the same sampling rate, M>N), then:

$$p_S = \left(\sum_{i=1}^{M} Ui * Ii\right) / M$$

The control unit 360 determines from comparing the slow average power $P_S$ to a second threshold whether or not to generate the control signal or the alarm signal. In one solution, if the fast average power $P_F$ is greater than the first threshold and the slow average power $P_S$ is also greater than the second threshold, then the control signal is generated. If the fast average power $P_F$ approximates the first threshold but does not exceed the first threshold, and the slow average power $P_S$ also approximates the second threshold but does not exceed the second threshold, then the alarm signal is generated.

In a further secondary solution, the control unit 360 calculates from the detected operation voltages about the power supply circuit 900B an amplitude of variation in the operation voltages. Based on the variation amplitude of the operation voltages, it is determined whether or not to generate the control signal or the alarm signal. For example, if the fast average power $P_F$ is greater than the first threshold and the variation amplitude of operation voltages from the power supply circuit 900B is also greater than a predetermined threshold, then the control signal is generated. If the fast average power $P_F$ approximates the first threshold but does not exceed the first threshold, and the amplitude of variation in operation voltages from the power supply circuit 900B does not exceed the predetermined threshold, then the alarm signal is generated.

In a yet further secondary solution, an operation parameter detected by the data acquisition and processing circuit 320 may include a residual current of the power supply circuit 900B. The control unit 360 calculates an amplitude of variation in residual currents according to the residual currents. Based on the variation amplitude of the residual currents, it is determined whether or not to generate the control signal or the alarm signal. For example, if the fast average power $P_F$ is greater than the first threshold and the amplitude of variation in residual currents of the power supply circuit 900B is also greater than a predetermined threshold, then the control signal is generated. If the fast average power $P_F$ approximates the first threshold but does not exceed the first threshold, and the amplitude of variation in residual currents of the power supply circuit 900B does not exceed the predetermined threshold, then the alarm signal is generated. In this secondary solution, it is possible to effectively differentiate inherent leakage of the system from dangerous leakage by monitoring the residual current of the power supply circuit 900B. In addition, when a climate or environment changes, inherent leakage of the system may also change, thereby resulting in the detected residual current with a small amplitude variation. By setting the above-mentioned predetermined threshold reasonably, it is possible to reduce influence of the climate or environment, and further to improve accuracy of generating the control signal and/or alarm signal by the system.

In another secondary solution, an operation parameter detected by the data acquisition and processing circuit 320 may include a power factor of the power supply circuit 900B. The control unit 360 determines from the power factor whether or not to generate the alarm signal. For example, if the power factor of the power supply circuit 900B is below a predetermined threshold, then the alarm signal is generated.

In still further secondary solution, an operation parameter detected by the data acquisition and processing circuit 320 may include an operation temperature of the power supply circuit 900B. The control unit 360 determines from the operation temperature whether or not to generate the control signal or the alarm signal. For example, if the operation temperature of the power supply circuit 900B is greater than a first predetermined threshold but does not exceed a second predetermined threshold, then the alarm signal is generated. If the operation temperature of the power supply circuit 900B exceeds the second predetermined threshold, then the control signal is generated.

In another embodiment of the present invention, the control unit 360 may also determine from only any one of the above-mentioned secondary solutions whether or not to generate the control signal or the alarm signal. The control unit 360 may also combine the above-mentioned technical solution described with respect to FIG. 9 with any one or more of the above-mentioned secondary solutions, or may combine two or more of the above-mentioned secondary solutions to determine whether or not to generate the control signal or the alarm signal. In one embodiment, the amplitude of variation in operation voltage of the above-mentioned power supply circuit 900B serves as a basic information of a state of the power supply circuit, and the operation temperature of the above-mentioned power supply circuit 900B serves as an additional information of the state of the power supply circuit. The control unit 360 may determine from combining the basic information and the additional information whether or not to generate the control signal or the alarm signal. For example, in case that the amplitude of variation in operation voltage of the power supply circuit 900B exceeds a predetermined threshold, if the operation temperature of the power supply circuit 900B also exceeds another predetermined threshold, then the control signal is generated; but if the operation temperature of the power supply circuit 900B does not exceed another predetermined threshold, then the alarm signal is generated. Since the control signal can start the operation of disconnecting the power supply circuit 900B, and the alarm signal can in time alert the customer to pay attention to electrical safety, the safety performance of the monitored electricity utilization system can be enhanced further.

In the embodiment shown in FIG. 8, the control unit 360 may be an independent module, or may also be integrated in the data acquisition and processing circuit 320, or may also be integrated with the data communication module 330. Since no isolated power supply is used, it is possible to significantly reduce a volume of a device 400 for acquiring electricity utilization information when the non-isolated power supply 310, the data acquisition and processing circuit 320, the control unit 360, the data communication module 330 and the isolation component 340 are assembled in one box to be the device 400.

Figure 10:
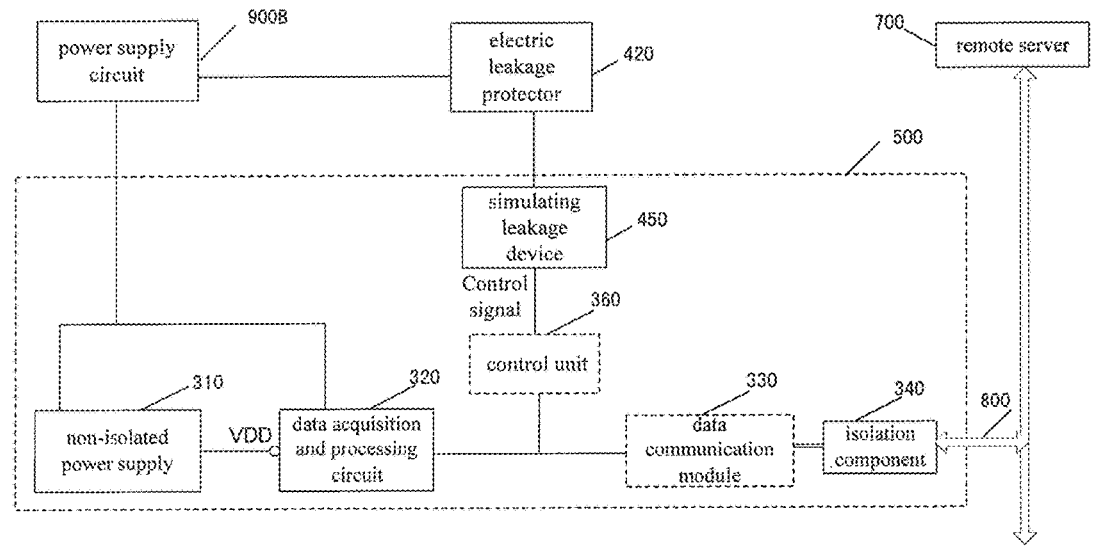
FIG. 10 is a schematic diagram showing a device for acquiring electricity utilization information according to yet another embodiment of the present invention.

FIG. 10 is a schematic diagram showing a device for acquiring electricity utilization information according to another embodiment of the present invention. In FIG. 10, the device includes a simulating leakage device 450. The simulating leakage device 450 can enter a simulating leakage state in response to the above-mentioned control signal. While the simulating leakage device 450 is in the simulating leakage state, the simulating leakage device 450 simulates to generate a leakage current. The simulated leakage current would cause an electric leakage protector 420 connected with the power supply circuit 900B to detect the leakage current arising in the power supply circuit 900B, and then to disconnect the power supply circuit 900B.

Figure 11:
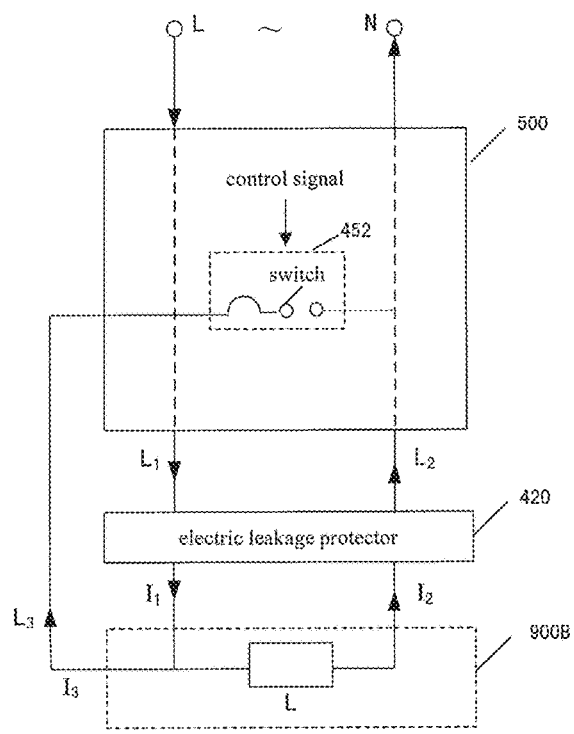
FIG. 11 shows a schematic diagram of an operation of a simulating leaking device according to one embodiment of the present invention.

The operation of the simulating leakage device 450 will be described in detail below with reference to FIG. 11. As shown in FIG. 11, the simulating leakage device 450 may include a switch 452 and a current shunting line L3. The electric leakage protector 420 may include a zero sequence transducer (not shown in the figure). In a normal operating condition, the switch 452 is in an OFF state. A load L in the power supply circuit 900B is supplied with power via an $L_1$-$L_2$ loop. If no leakage current occurs in the power supply circuit 900B, the input current $I_1$ of the power supply circuit 900B would be substantially equal to the return current $I_2$ of the power supply circuit 900B. Therefore, the electric leakage protector will not carry out an operation of disconnecting power supply circuit 900B. When the simulating leakage device 450 receives the control signal, the switch 452 will be closed in response to the control signal. The current $I_1$ input into the power supply circuit 900B are shunted into a current $I_2$ along a branch $L_2$ and a current $I_3$ along a current shunting line $L_3$, where $I_1=I_2+I_3$. That is, the closing operation of the switch 452 simulates to generate a leakage current $I_3$. Since $I_1$ is not equal to $I_2$, the electric leakage protector 420 in the $L_1$-$L_2$ loop would consider that a leakage current arises in the power supply circuit 900B, and thus carry out the operation of disconnecting the power supply circuit 900B.

In one embodiment, the switch 452 may be an electric relay. In another embodiment, the switch 452 may be a semiconductor device such as a transistor, an isolated gate bipolar transistor (IGBT) or a metal oxide semiconductor field effect transistor (MOSFET) to reduce the driving power for the switch 452.

In the embodiment shown in FIG. 10, the simulating leakage device 450 can be assembled in a box 500 together with the non-isolated power supply 310, the data acquisition and processing circuit 320, the data communication module 330, the isolation component 340 and the control unit 360, or may also be arranged outside the box 500. Similarly, the electric leakage protector 420 can be mounted in the box 500, or may also be arranged outside the box 500.

Since no isolated power supply is used, it is possible to significantly reduce a volume of a device 500 for acquiring electricity utilization information when the non-isolated power supply 310, the data acquisition and processing circuit 320, the data communication module 330, the isolation component 340, the control unit 360 and the simulating leakage device 450 are assembled in one box to be the device 500.

Figure 12:
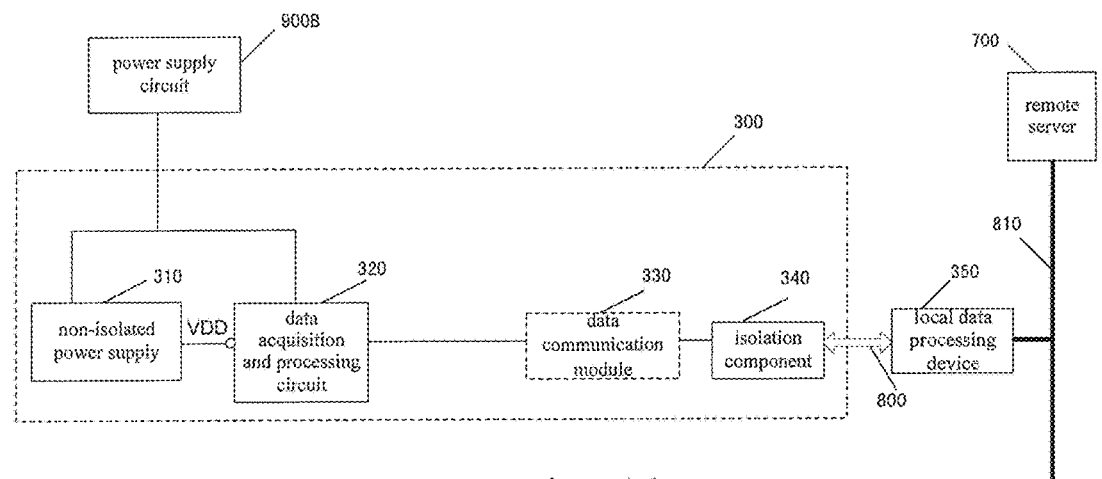
FIG. 12 is a schematic diagram showing a device for acquiring electricity utilization information according to yet another embodiment of the present invention.

FIG. 12 is a schematic diagram showing a device for acquiring electricity utilization information according to yet another embodiment of the present invention. As compared with the device shown in FIG. 6, a local data processing device 350 is provided. In the embodiment shown in FIG. 12, the data communication module 330 modulates an operation parameter about the power supply circuit 900B detected by the data acquisition and processing circuit 320 onto a predetermined frequency. The modulated operation parameter is output onto the bus 800 via the isolation component 340 and transmitted to the local data processing device 350 via the bus 800. The local data processing device 350 reports the operation parameter to the remote server 700 via a transmission line 810. The transmission line 810 may use a bus contention communication mode. The transmission line 810 may be any one of the three AC power lines; or may also be a dedicated communication line, such as an Ethernet line, twisted pair line or telephone line, etc. The remote server 700 implements energy consumption analysis and electricity utilization management according to the received operation parameter.

After receiving the operation parameter transmitted via the bus 800, the local data processing device 350 may forward the operation parameter to the remote server 700 directly, or may first generate custom information for the power supply circuit 900B by preliminary processing of the operation parameter, and then transmit the custom information to the remote server 700. In one embodiment, the local data processing device 350 may calculate from the operation parameter an electrical energy consumed by the power supply circuit 900B during a predetermined time of period (for example one day) and send the consumed electrical energy as the custom information to the remote server 700.

Furthermore, the local data processing device 350 can not only receive and process the operation parameter about the power supply circuit provided by one box 300, but also can receive and process the operation parameters of corresponding power supply circuits transmitted via the bus 800 by a plurality of boxes 300. The local data processing device 350 transmits the operation parameters provided by one or more of boxes 300 as the electricity utilization information to the remote server 700.

The solution of generating the control signal or alarm signal by the control unit 360 and various secondary solutions as described above with reference to FIG. 9 may also be implemented by the local data processing device 350. In other words, the local data processing device 350 may also compare a received operation parameter with a predetermined threshold to generate a control signal for disconnecting the power supply circuit 900B or an alarm signal. In one embodiment, the local data processing device 350 provides the generated control signal to the box 300 via the bus 800. The isolation component 340 in the box 300 may receive the control signal transmitted via the bus 800 and provide the control signal to the data communication module 330. The data communication module 330 receives the control signal transmitted via the isolation component 340 and starts the operation of disconnecting said power supply circuit according to the control signal. In one embodiment, the data communication module 330 may provide the control signal to an electric relay (not shown); and trigger an electric leakage protector by an operation of the relay to disconnect the power supply circuit 900B.

Furthermore, the solution of generating the control signal or alarm signal by the control unit 360 and various secondary solutions as described above with reference to FIG. 9 may also be implemented by the remote server 700. That is, the remote server 700 may compare a received operation parameter with a predetermined threshold to generate a control signal for disconnecting the power supply circuit 900B or an alarm signal. In one embodiment (referring to FIG. 12), the remote server 700 may send the generated control signal through a transmission line 810. The local data processing device 350 may forward the control signal transmitted through the transmission line 810. The isolation component 340 in the box 300 provides the control signal forwarded through the bus 800 to the data communication module 330. The data communication module 330 may start an operation of disconnecting said power supply circuit according to the control signal. In another embodiment (referring to FIG. 6), the remote server 700 may send the generated control signal through the bus 800. The isolation component 340 in the box 300 may receive the control signal transmitted via the bus 800 and provide the control signal to the data communication module 330. The data communication module 330 may receive the control signal transmitted via the isolation component 340 and start an operation of disconnecting said power supply circuit according to the control signal.

Figure 13:
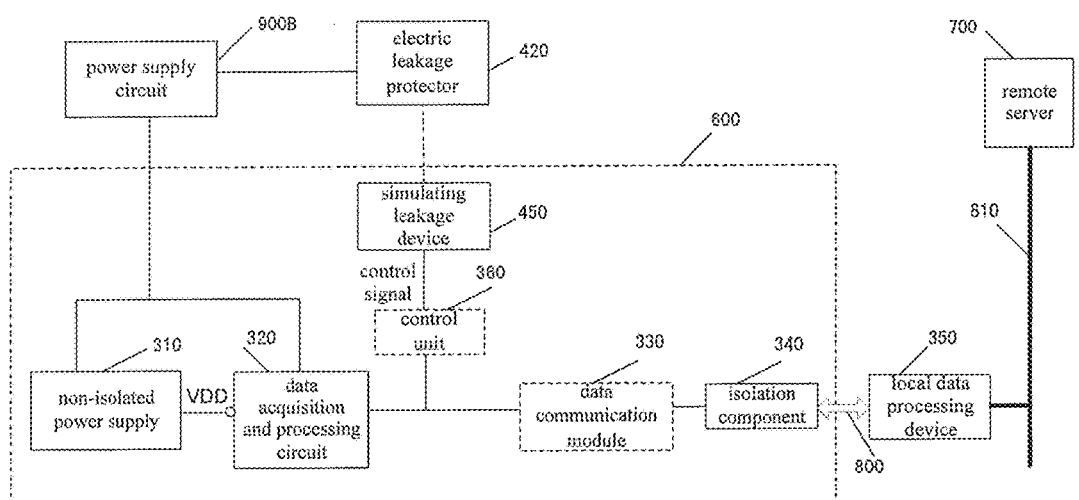
FIG. 13 is a schematic diagram showing a device for acquiring electricity utilization information according to yet another embodiment of the present invention.

FIG. 13 is a schematic diagram showing a device for acquiring electricity utilization information according to yet another embodiment of the present invention. As shown in FIG. 13, a non-isolated power supply 310, a data acquisition and processing circuit 320, a data communication module 330, an isolation component 340, a control unit 360 and a simulating leakage device 450 are assembled in one box 600. An electric leakage protector 420 is arranged outside the box 600. In FIG. 13, components with reference numerals identical to those of components in the above-mentioned FIGS. 3 to 11 have identical or similar structures and functions, and will not be described any more herein for simplicity.

In the device shown in FIG. 13, as described in the above embodiments, the operation of generating a control signal or an alarm signal may be implemented by the control unit 360, or by a local data processing device 350, or may also be implemented by a remote server 700.

Furthermore, the remote server 700 can further generate an instruction. In the above-mentioned embodiment in which the local data processing device 350 generates the control signal or the alarm signal (referring to FIG. 12), the local data processing device 350 may receive the instruction transmitted via a transmission line 810 and update a corresponding predetermined threshold according to the instruction. In the above-mentioned another embodiment in which the control unit 360 generates the control signal or the alarm signal (referring to FIG. 8), the remote server 700 may send the generated instruction via the bus 800 (the instruction is transmitted via the bus 800 after being modulated). The isolation component 340 in the box 400 may receive the instruction transmitted via the bus 800 and supply the instruction to the data communication module 330. The control unit 360 may update a corresponding predetermined threshold according to the instruction provided by the data communication module 330 (i.e., demodulating the instruction). In the above-mentioned one embodiment in which the control unit 360 generates the control signal or the alarm signal (referring to FIG. 13), the remote server 700 may send the generated instruction via the transmission line 810 (the instruction is transmitted via the bus 810 after being modulated). The local data processing device 350 may forward the instruction transmitted through the transmission line 810. The isolation component 340 in the box 600 may provide the forwarded instruction transmitted through the bus 800 to the data communication module 330. The control unit 360 may update a corresponding predetermined threshold according to the instruction provided by the data communication module 330 (i.e., demodulating the instruction).

Figure 14:
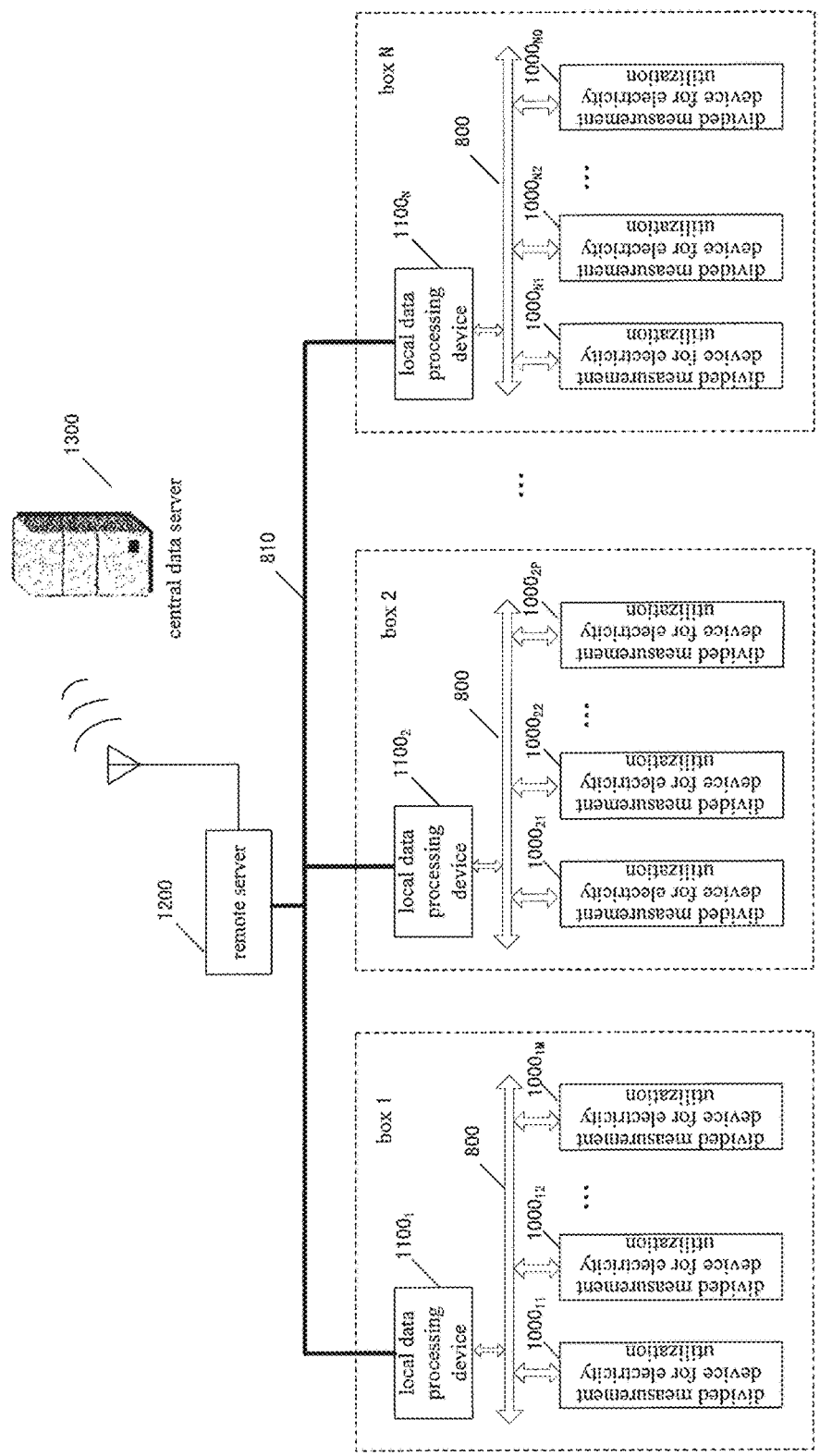
FIG. 14 is a schematic diagram showing a system for acquiring electricity utilization information according to one embodiment of the present invention.

FIG. 14 is a schematic diagram showing a system for acquiring electricity utilization information according to one embodiment of the present invention. In FIG. 14, a divided measurement device 1000 for electricity utilization may use any one of boxes 200, 300, 400, 500 and 600 in embodiments shown in FIGS. 2 to 13. A local data processing device 1100 may be the local data processing device 350 in the embodiments shown in FIGS. 12 to 13. A remote server 1200 may be the remote server 700 in embodiments shown in FIGS. 6 to 12. The divided measurement device $1000_{11}$ for electricity utilization, the divided measurement device $1000_{12}$ for electricity utilization . . . and the divided measurement device $1000_{1M}$ for electricity utilization are mounted in box 1 with the local data processing device $1100_1$ so as to provide electricity utilization information of one electricity utilization unit (first electricity utilization unit); the divided measurement device $1000_{21}$ for electricity utilization, the divided measurement device $1000_{22}$ for electricity utilization . . . and the divided measurement device $1000_{2P}$ for electricity utilization are mounted in box 2 with the local data processing device $1100_2$ so as to provide electricity utilization information of a second electricity utilization unit; . . . ; and the divided measurement device $1000_{N1}$ for electricity utilization, the divided measurement device $1000_{N2}$ for electricity utilization . . . and the divided measurement device $1000_{NQ}$ for electricity utilization are mounted in box N with the local data processing device $1100_N$ so as to provide electricity utilization information of a $N^{th}$ electricity utilization unit.

In one embodiment, the box 1 is configured to detect operation parameters of 4 power supply circuits. The divided measurement device $1000_{11}$ for electricity utilization is configured to provide operation parameters of an illumination circuit; the divided measurement device $1000_{12}$ for electricity utilization is configured to provide operation parameters of a receptacle circuit; the divided measurement device $1000_{13}$ for electricity utilization is configured to provide operation parameters of a kitchen electric appliance circuit; and the divided measurement device $1000_{14}$ for electricity utilization is configured to provide operation parameters of an air conditioner circuit. The operation parameters of the illumination circuit, the operation parameters of the receptacle circuit, the operation parameters of the kitchen electric appliance circuit and the operation parameters of the air conditioner circuit are transmitted to the local data processing device $1100_1$ via a bus 800. After receiving these operation parameters transmitted via the bus 800, the local data processing device $1100_1$ may forward these operation parameters directly to the remote server 1200, or may also transmit operation parameters over a predetermined channel. In one embodiment, the local data processing device $1100_1$ may transmit operation parameters of the kitchen electric appliance circuit and operation parameters of the air conditioner circuit as electricity utilization information of large electricity utilization equipments to the remote server 1200 through a predetermined communication channel.

In the embodiment shown in FIG. 14, the number (M, P, . . . Q) of divided measurement devices for electricity utilization in each box may be determined according to the number of power supply circuits to be detected. When a box contains only one divided measurement device 1000, the box may be used to detect a power supply circuit of one single electricity utilization unit. Although in such a case, the box does not provide electricity utilization information of each power supply sub-circuit that constitutes the power supply circuit of the electricity utilization unit, the box has a substantially reduced volume for convenient installation as compared with the prior art distribution boxes.

In the embodiment shown in FIG. 14, the remote server 1200 may also transmit electricity utilization information of each electricity utilization unit to a central data server 1300 in a wired or wireless manner to facilitate central energy consumption analysis and electricity utilization management.

Some embodiments of the present invention have been described in detail above with respect to accompanying drawings. These embodiments may be combined as desired without departing from the scope recited originally in the present invention.

In addition, the term "coupleable" as used in the description and the claims means a direct connection or an indirect connection via an electronic part. For example, the data acquisition and processing circuit is configured to detect an operation parameter of a coupleable power supply circuit, which means the data acquisition and processing circuit may be connected directly or indirectly via an electronic part with the power supply circuit, and the power supply circuit is not within a device (such as, the divided measurement device 1000 for electricity utilization) comprising the data acquisition and processing circuit.

The present invention is not limited to these disclosed embodiments, and other solutions derived therefrom by those skilled in the art are also within the scope of the present invention. Therefore, the scope of the present invention should be defined by the appended claims.

It is to be noted that in the claims, the term "include" does not exclude the presence of elements, units or devices not recited in the claims or the description. The term "a" or "an" preceding an element, a unit or a device does not exclude the presence of a plurality of the elements, units or devices. In a device claim enumerating several units, some of these units may be implemented by the same kind of software and/or hardware.

The invention claimed is:

1. A device for acquiring electricity utilization information, comprising:
   a data acquisition and processing circuit configured to detect an operation parameter about a coupleable power supply circuit;
   a non-isolated power supply configured to convert an AC power into a DC power to supply an appropriate operation voltage to the data acquisition and processing circuit;
   a data communication module configured to modulate the detected operation parameter onto a predetermined frequency, wherein the modulated operation parameter is transmitted with a predetermined data transmission rate, and the predetermined frequency is higher than the predetermined data transmission rate such that the transmitted operation parameter can be demodulated; and
   a passive magnetic coupling isolation component coupled to an output of the data communication module and configured to provide both electrical isolation and signal transmission magnetic isolation to the data communication module for performing a magnetic coupling isolation for the modulated operation parameter.

2. The device for acquiring electricity utilization information of claim 1, wherein said modulation is one of an amplitude shift keying (ASK) modulation, a frequency shift keying (FSK) modulation and a phase shift keying (PSK) modulation; or
   wherein said passive magnetic coupling isolation component transmits said modulated operation parameter via a bus that adopts a bus contention communication mode; or
   wherein said non-isolated power supply comprises:
   a step-down capacitor configured to step down an electric potential generated by said AC power;
   a rectifying filtering circuit configured to rectify and filter the AC power with the reduced electric potential; and
   a voltage stabilizer configured to stabilize an output of the rectifying filtering circuit; or
   wherein said passive magnetic coupling isolation component is a magnetic coupling isolation transformer with a primary to secondary coil ratio of 1:1; or
   wherein said operation parameter is at least any one of an operation current, an operation voltage, a residual current, a power factor and an operation temperature of said power supply circuit.

3. The device for acquiring electricity utilization information of claim 1, further comprising:
   a control unit configured to compare said operation parameter with a predetermined threshold to generate a control signal for disconnecting said power supply circuit or an alarm signal, or
   a display component for displaying said operation parameter.

4. The device for acquiring electricity utilization information of claim 2, further comprising:
   a local data processing device configured to receive said transmitted operation parameter and forward said operation parameter via a transmission line that adopts the bus contention communication mode.

5. The device for acquiring electricity utilization information of claim 4, wherein:
   said local data processing device compares said operation parameter and a predetermined threshold to generate a control signal for disconnecting said power supply circuit or an alarm signal;
   said passive magnetic coupling isolation component supplies the control signal transmitted via said bus by said local data processing device to said data communication module; and
   said data communication module starts an operation of disconnecting said power supply circuit according to the control signal.

6. The device for acquiring electricity utilization information of claim 2, further comprising:
   a remote server configured to receive said transmitted operation parameter and compare said operation parameter with a predetermined threshold to generate a control signal for disconnecting said power supply circuit or an alarm signal;
   wherein,
   said passive magnetic coupling isolation component supplies the control signal transmitted via said bus by said remote server to said data communication module; and
   Said data communication module starts an operation of disconnecting said power supply circuit according to the control signal.

7. The device for acquiring electricity utilization information of claim 4, further comprising:
   a remote server configured to receive said forwarded operation parameter and compare said operation parameter with a predetermined threshold to generate a control signal for disconnecting said power supply circuit or an alarm signal;
   wherein,
   said local data processing device forwards the control signal transmitted via said transmission line by said remote server;
   said passive magnetic coupling isolation component supplies the forwarded control signal transmitted via said bus to said data communication module; and
   said data communication module starts an operation of disconnecting said power supply circuit according to the control signal.

8. The device for acquiring electricity utilization information of claim 3, further comprising:

a simulating leakage device configured to enter a simulating leakage state in response to said control signal to enable an electric leakage protector coupleably connected in the power supply circuit to disconnect said power supply circuit.

9. The device for acquiring electricity utilization information of claim 8, wherein said simulating leakage device comprises:
a switch configured to close in response to said control signal; and
a current shunting line,
wherein when said switch is closed, a part of an input current of said power supply circuit flows through the current shunting line to allow said simulating leakage device to enter the simulating leakage state.

10. The device for acquiring electricity utilization information of claim 5, further comprising:
a remote server configured to generate an instruction;
wherein,
said local data processing device receives the instruction transmitted via said transmission line and updates said predetermined threshold according to the instruction.

11. The device for acquiring electricity utilization information of claim 3, further comprising:
a remote server configured to generate an instruction, and transmit the instruction via a bus that adopts a bus contention communication mode;
wherein,
said passive magnetic coupling isolation component receives the instruction and supplies the instruction to said control unit via said data communication module; and
said control unit updates said predetermined threshold according to the instruction.

12. The device for acquiring electricity utilization information of claim 4, wherein
said local data processing device generates custom information for said power supply circuit base on said operation parameter, and transmits the custom information via said transmission line, or
said local data processing device transmits said operation parameter with a predetermined communication channel via said transmission line.

13. The device for acquiring electricity utilization information of claim 4, wherein said transmission line is any one of a line of AC lines, an Ethernet line, a twisted pair line and a telephone line.

14. A method for acquiring electricity utilization information, comprising:
converting, by a non-isolated power supply, an AC power into a DC power to provide an appropriate operation voltage;
detecting an operation parameter of a coupleable power supply circuit with the operation voltage;
modulating, by a data communication module, the detected operation parameter onto a predetermined frequency, wherein the modulated operation parameter is transmitted with a predetermined data transmission rate, and the predetermined frequency is higher than the predetermined data transmission rate such that the transmitted operation parameter can be demodulated; and
providing, by a passive magnetic coupling isolation component coupled to an output of the data communication module, both electrical isolation and signal transmission magnetic isolation to the data communication module for performing a magnetic coupling isolation for the modulated operation parameter.

15. The method for acquiring electricity utilization information of claim 14, wherein said modulation is one of an amplitude shift keying (ASK) modulation, a frequency shift keying (FSK) modulation and a phase shift keying (PSK) modulation, or
wherein said operation parameter comprises an operation current and an operation voltage of said power supply circuit, said method further comprising:
obtaining a set of operation power values about said power supply circuit during a first predetermined period of time, wherein the operation power values are obtained based on said operation currents and operation voltages detected at sampling instants during the first predetermined period of time;
calculating an average of the set of operation power values based on the set of operation power values about said power supply circuit during the first predetermined period of time to obtain a fast average power of said power supply circuit; and
comparing the fast average power with a first threshold to determine whether or not to generate a control signal or an alarm signal, wherein the control signal is configured to enable an electric leakage protector coupleably connected in said power supply circuit to disconnect said power supply circuit, and the alarm signal is configured to indicate that there is a potential electrical safety hazard in said power supply circuit.

16. The method for acquiring electricity utilization information of claim 14, further comprising:
outputting said modulated operation parameter to a bus; and
transmitting said modulated operation parameter in a bus contention communication mode.

17. The method for acquiring electricity utilization information of claim 15, further comprising:
obtaining a set of operation power values about said power supply circuit during a second predetermined period of time, wherein the operation power values are obtained based on said operation currents and operation voltages detected at sampling instants during the second predetermined period of time, and the second predetermined period of time is longer than the first predetermined period of time;
calculating an average of the set of operation power values based on the set of operation power values about said power supply circuit during the second predetermined period of time to obtain a slow average power of said power supply circuit; and
comparing the slow average power with a second threshold to determine whether or not to generate said control signal or said alarm signal.

18. The method for acquiring electricity utilization information of claim 14, wherein said operation parameter comprises an operation voltage of said power supply circuit, said method further comprising:
calculating a variation amplitude of the operation voltage according to the operation voltage of said power supply circuit; and
determining from the variation amplitude of the operation voltage whether or not to generate a control signal or an alarm signal,
wherein the control signal is configured to enable an electric leakage protector coupleably connected in said power supply circuit to disconnect said power supply circuit, and the alarm signal is configured to indicate that there is a potential electrical safety hazard in said power supply circuit; or wherein said operation parameter comprises an residual current of said power supply circuit, said method further comprising:

calculating a variation amplitude of the residual current according to the residual current of said power supply circuit; and determining from the variation amplitude of the residual current whether or not to generate a control signal or an alarm signal, wherein the control signal is configured to enable an electric leakage protector coupleably connected in said power supply circuit to disconnect said power supply circuit, and the alarm signal is configured to indicate that there is a potential electrical safety hazard in said power supply circuit; or wherein said operation parameter comprises a power factor or an operation temperature of said power supply circuit, said method further comprising:

determining from the power factor or the operation temperature of said power supply circuit whether or not to generate said a control signal or said an alarm signal, wherein the control signal is configured to enable an electric leakage protector coupleably connected in said power supply circuit to disconnect said power supply circuit, and the alarm signal is configured to indicate that there is a potential electrical safety hazard in said power supply circuit.

19. A method for improving electrical safety, comprising:

detecting an operation parameter of a coupleable power supply circuit using a method for acquiring electricity utilization information, the method comprising:

converting an AC power into a DC power to provide an appropriate operation voltage;

detecting an operation parameter of a coupleable power supply circuit with the operation voltage;

modulating the detected operation parameter onto a predetermined frequency, wherein the modulated operation parameter is transmitted with a predetermined data transmission rate, and the predetermined frequency is higher than the predetermined data transmission rate such that the transmitted operation parameter can be demodulated; and providing electrical isolation and signal transmission magnetic isolation to perform a magnetic coupling isolation for the modulated operation parameter;

obtaining a basic information on a state of said power supply circuit according to the detected operation parameter;

obtaining an additional information on the state of said power supply circuit according to the detected operation parameter; and combining the basic information and the additional information to determine whether or not to generate a control signal or an alarm signal, wherein the control signal is configured to enable an electric leakage protector coupleably connected in said power supply circuit to disconnect said power supply circuit, and the alarm signal is configured to indicate that there is a potential electrical safety hazard in said power supply circuit.

20. The method for improving electrical safety of claim 19, wherein said operation parameter is at least any one of an operation current, an operation voltage, a residual current, a power factor and an operation temperature of said power supply circuit;

said basic information and said additional information are respectively at least any one of a fast average power, a slow average power, a variation amplitude of the operation voltage, a variation amplitude of the residual current, the power factor and the operation temperature, and the basic information is different from the additional information;

the fast average power is an average of a set of operation power values over a first predetermined period of time, and the operation power values are obtained based on the operation currents and the operation voltages of said power supply circuit obtained at sampling instants; and the slow average power is an average of a set of operation power values over a second predetermined period of time that is longer than the first predetermined period of time.

* * * * *